Jan. 16, 1962 C. K. WILSON ET AL 3,016,936
APPARATUS FOR LOOSENING TOMATO SKINS
Original Filed May 28, 1954 2 Sheets-Sheet 1
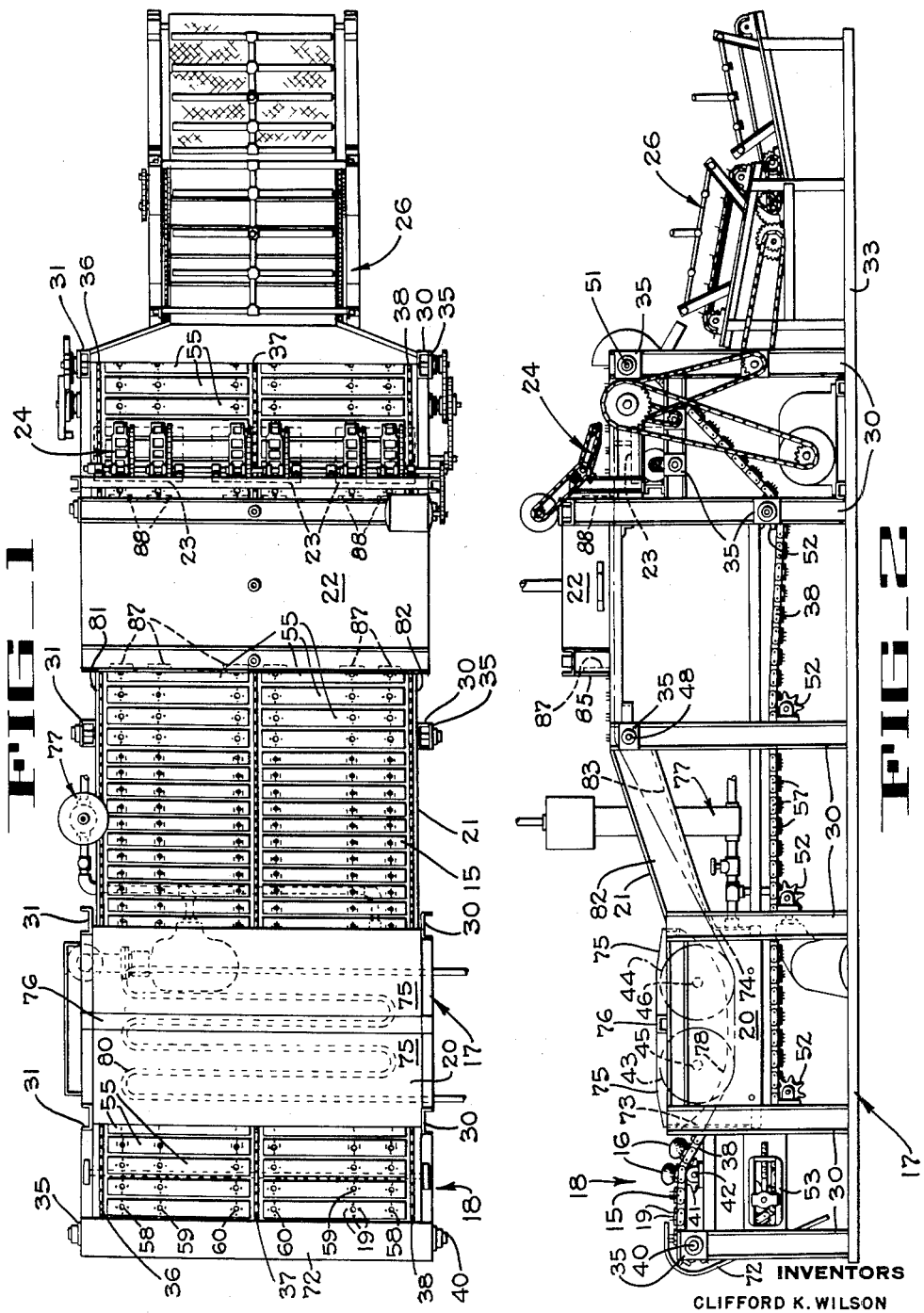
INVENTORS
CLIFFORD K. WILSON
ROBERT H. MOUNT
ROBERT O. JABBUSCH
BY Hans G. Hoffmeister
ATTORNEY

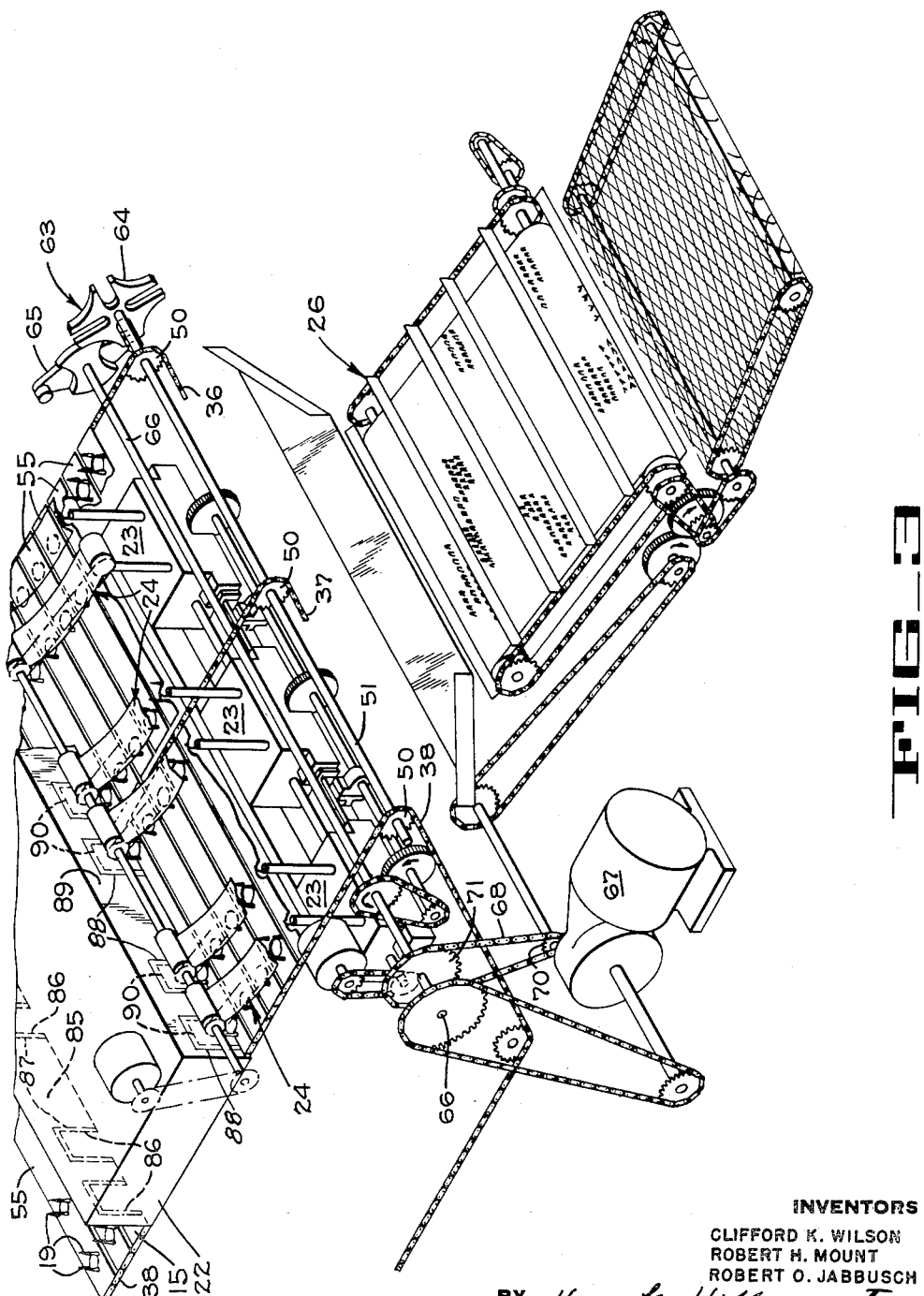

3,016,936
APPARATUS FOR LOOSENING TOMATO SKINS
Clifford K. Wilson, San Jose, Calif., Robert H. Mount, Hoopeston, Ill., and Robert O. Jabbusch, Green Bay, Wis., assignors to FMC Corporation, a corporation of Delaware
Original application May 28, 1954, Ser. No. 433,064, now Patent No. 2,862,535, dated Dec. 2, 1958. Divided and this application Oct. 27, 1958, Ser. No. 769,681
3 Claims. (Cl. 146—47)

This invention pertains to apparatus for processing fruits and vegetables and more particularly relates to an improved apparatus for subjecting tomatoes or the like to treatment by a caustic solution.

While the peeling apparatus of the present invention may be used in the processing of a variety of different fruits and vegetables, it is particularly effective in processing tomatoes. Accordingly, in the following specification an installation adapted for treating tomatoes will be disclosed as a preferred embodiment of the invention.

The present application is a division of U.S. application for Patent Serial No. 433,064 filed May 28, 1954, now Patent No. 2,862,535.

An object is to provide a tomato processing apparatus having a drain section of predetermined length in which each tomato is held for an optimum period of time under atmospheric conditions of temperature and pressure to permit the previously applied lye solution to penetrate the skin of the tomato.

Another object is to provide an efficient mechanism for subjecting a tomato to the action of a caustic solution.

Other and further objects and advantages of the present invention will become apparent to one skilled in the art from the following detailed description taken in connection with the drawings:

FIG. 1 is a plan view of the tomato peeling machine of the present invention.

FIG. 2 is a side elevation of the machine of FIG. 1.

FIG. 3 is a diagrammatic perspective of one end of the tomato peeling machine, particularly showing the drive mechanism.

In FIGS. 1 and 2 the reference numeral 15 indicates an intermittently moving endless chain conveyor having an upper run movable toward the right, as seen in FIG. 2, to carry tomatoes 16 through a series of processing stations provided in a frame support structure 17. At a loading station 18 each tomato 16 is impaled, stem end down, on upstanding prongs 19 which are mounted on the conveyor 15. As the tomato is carried to the right, it passes into a tank 20 in which it is submerged for a predetermined period of time in a solution of lye. After leaving the tank 20, the tomato is carried along an uncovered, upwardly inclined section 21 of the frame structure 17. In section 21, which will be referred to hereinafter as the holding section, excess lye is drained from the tomato and the tomato is exposed to the atmosphere for a fixed period of time during which the lye on the skin penetrates to the desired depth to effect loosening of the skin from the flesh of the tomato body. From the holding section, the tomato passes into a steam chamber 22 in which steam at atmospheric pressure raises the temperature of the tomato skin to a predetermined optimum peeling temperature. After leaving the steam chamber 22, the tomato is momentarily stopped over a coring unit 23 which has a blade movable upwardly through an opening in the conveyor to remove the core from the tomato and sever the skin at the bottom or stem end of the tomato from the tomato body. Following the coring operation the tomato is moved under a floating cutter assembly 24 which removes the top or blossom end of the tomato. At this stage, the skin of the tomato has been completely loosened from the flesh of the tomato body and has been separated from its connections at the stem and blossom ends of the tomato. The tomato is now discharged from the conveyor 15 and drops a short distance onto a skin removing unit 26 where the skin is separated from the flesh of the tomato by a gentle pushing and rubbing action.

The support frame 17 (FIGS. 1 and 2) is a welded structure consisting of a series of spaced vertical channels 30 defining one side of the machine. Each of the channels 30 is directly opposite a similar vertical channel 31 in a line of channels which define the opposite side of the machine. The channels 30 and 31 are bolted to floor channels 33 (FIG. 2) and are connected in conventional manner by suitable transverse and longitudinal braces. Ball bearing pillow blocks 35 are mounted at various positions along the frame.

The chain conveyor 15 (FIG. 1) comprises three chains 36, 37, and 38 which extend longitudinally in spaced parallel relation along the entire length of the frame 17. Adjacent the loading station 18 the upper run of each chain is trained around a sprocket (not shown) which is keyed to a transverse rotatable shaft 40 (FIG. 2). As it travels toward the right, each chain (shown partly in phantom lines) is guided over a sprocket 41 keyed to a transverse rotatable shaft 42, then under two idler sprockets 43 and 44 which are keyed to rotatable shafts 45 and 46, respectively, over an idler sprocket (not shown) which is keyed to a rotatable shaft 48, and around a drive sprocket 50 (FIG. 3) keyed to a drive shaft 51. The lower run of each chain is held in horizontal position by idler sprockets 52 (FIG. 2). A standard chain tensioning device 53 is used with each chain.

To provide a support for the tomatoes as they are carried through the machine, the conveyor chains are fitted with channel-shaped transverse flights 55 (FIG. 1) which are riveted to laterally projecting mounting arms of specially designed chain links 57 (FIG. 2). The details of the flights 55 and the manner in which the flights are mounted on the conveyor chains are disclosed in the above mentioned application Ser. No. 433,064. It will be understood that, on each of the outer chains 36 and 38 (FIG. 1), the special link 57 is located on the inner side of the chain with its mounting arm projecting inwardly therefrom, while the middle chain 37 has special links on both sides with the mounting arms projecting in opposite directions. Each flight 55 is provided with three bored openings 58, 59 and 60 through which the coring knives are raised to remove the cores from tomatoes temporarily stopped thereover. Around each coring opening there are four equally spaced holes in which the impaling pins 19 are welded. Surrounding the pins 19 is another set of holes which are arranged in a uniform pattern to permit drainage of liquid and which serves as a sight gage to facilitate the centering of the tomato on the impaling pins. It will be noted in FIG. 1 that in each flight the openings 58 and 59 are adjacent, while the opening 60 in the flight is spaced from opening 59 but is close to the opening 60 of the laterally adjacent flight. Accordingly, three double rows of impaling pins 19 are formed on the conveyor flights with the pins in each row being about eight inches apart.

The conveyor 15 is driven by the drive shaft 51 (FIG. 3) on which the three drive sprockets 50 are keyed. The shaft 51 is intermittently rotated by a Geneva mechanism 63, the slotted element 64 of which is keyed to the shaft 51 while the driving element 65 is keyed to a continuously rotating shaft 66. The shaft 66 is parallel to the shaft 51 and is driven by an electric motor 67 that is drivingly connected to the shaft 66 through a chain 68 trained around a sprocket 70 on the motor shaft and a sprocket 71 keyed to the shaft 66.

At the loading station (FIG. 2) the impaling pins 19 are shrouded behind a sheet metal guard 72 (FIGS. 1 and 2) adjacent which the operators stand while placing the tomatoes on the impaling pins.

The lye solution tank 20 is a sheet metal structure which extends entirely across the support frame 17 and is suitably secured thereto. An opening (not shown) is provided in the forward wall 73 of the tank above the level of the lye, affording an entrance passage for the chain conveyor 15. The conveyor 15 carries the tomatoes beneath the surface of the lye solution and out of the tank through an opening (not shown) in the rear wall 74. The tank 20 has removable covers 75 which are hinged to a transverse channel 76 of the frame 17. The density of the lye solution is controlled by means of an automatic density control instrument 77 that communicates with the tank through wall 74. To prevent the tomatoes from being dislodged as they pass through the lye solution, a woven wire belt or flexible sheet-like strip 78 is suspended in the tank above each single row of impaling pins. These belts may be about four inches wide and have sufficient weight to hold the tomatoes on the pins. A steam coil 80 (FIG. 1) is mounted in the bottom of the tank to maintain the desired temperature of the solution.

The uncovered section 21 of the conveyor constitutes a holding section which is of a length sufficient to keep each intermittently advancing tomato exposed to the atmosphere for a predetermined period during which the lye penetrates to the desired depth. The section 21 is defined by side walls 81 and 82 and a sloping bottom wall 83 (FIG. 2) which is connected to the rear wall 74 of the lye tank and is arranged to return to the tank liquid that drains from the tomatoes.

The steam chamber 22 consists of sheet metal panels secured to frame elements to form a box-like structure. The forward wall 85 (FIG. 3) of the chamber is provided with six spaced openings 86 (three only being illustrated), one opening being in alignment with each single line of impaling pins, and each opening being large enough to permit the passage of a pin group and a tomato impaled thereon. To prevent the escape of steam from the chamber 22, a gate 87 (FIGS. 1 and 2) of flexible material is secured to the inner surface of the forward wall 85 covering each opening 86. Each flexible gate may be secured to the wall only at its upper edge so that the gate will fold upwardly and ride over each tomato as it advances through the opening. Similar flexible gates 88 are mounted on the rear wall 89 of the steam chamber 22 adjacent exit openings 90 (FIG. 3) through which the lines of tomatoes pass as they leave the steam chamber. To maintain the temperature within the chamber at a desired level, a series of steam distributing pipes (not shown) are arranged in the steam chamber in such a manner that the steam emerging from the pipes at atmospheric pressure does not impinge directly on the tomatoes but is distributed around the tomatoes to provide a steam bath which maintains the temperature of the tomatoes at a desirable coring and peeling temperature.

After each flight of the conveyor leaves the steam chamber it is advanced to a position directly above a coring unit 23. In FIG. 1 three coring units 23 are indicated in dotted lines, one unit being aligned longitudinally of the machine with each double row of impaling pins. Each unit 23 has a pair of continuously rotating coring knives which are spaced so that each knife is directly beneath one of the two coring openings provided in the conveyor flights for each double row of pins. When the conveyor comes to rest, each rotating coring knife is moved upwardly through an opening in the flight to engage a tomato and cut out the core.

Following the coring operation, the tomato is moved under the floating cutter assembly 24 which removes the top or blossom end of the tomato. Then the tomato is discharged onto the skin removing unit 26 where the skin is separated from the flesh of the tomato by a gentle pushing and rubbing action. The construction and operation of the coring, blossom-end trimming and skin-removing units are described in detail in the above-mentioned application Serial No. 433,064.

In summary, at the loading section 18 (FIG. 2) a tomato is impaled stem end down on the pins 19 in centered position over an opening in the endless chain conveyor 15. As the upper run of the conveyor is moved intermittently toward the right in FIG. 2, the tomato is carried downwardly into and through the lye solution in the tank 20. While the tomato passes through the tank, a wire mesh belt 78 bears on the upper surface of the tomato to prevent it from being dislodged from the impaling pins. After leaving the lye tank 20, the tomato is intermittently advanced through the upwardly inclined holding section 21 wherein it is exposed to atmospheric conditions for a predetermined time to permit the lye to penetrate the skin to a depth sufficient to completely loosen the skin from the flesh of the tomato body. The tomato is then moved into the steam chamber 22 where saturated steam raises the temperature of the tomato skin to a desirable peeling temperature. The tomato is then carried out of the steam chamber and is cored and trimmed and has its skin removed.

It is evident that the temperature, concentration, and duration of application of the lye solution, the duration of the holding period, and the nature of the skin heating process will vary, depending upon the type of fruit or vegetable that is being processed. For some articles, the skin may be satisfactorily loosened by submerging the article in a bath of heated liquid, such as scalding water. It is within the scope of the present invention to apply the lye solution to the article by methods other than submerging, as for instance, by cascading the lye solution over the article.

The following arrangement has been found to be highly satisfactory for peeling tomatoes. The tomato is submerged for a period of from about 17 to 19 seconds in an 18% to 20% lye solution which is at a temperature of about 195 to 220° F. After the lye treatment, the tomato is transported in atmosphere for from about 28 to 32 seconds and then is subjected to the action of saturated steam at atmospheric pressure for about 18 to 20 seconds.

While a preferred apparatus has been described in the present application, it will be understood that it is capable of variations and modifications within the scope of the invention. It is to be understood, therefore, that the scope of the invention should be limited only by the scope and proper interpretation of the claims appended hereto.

Having thus described our invention what we claim as new and desire to protect by Letters Patent is:

1. Apparatus for preparing tomatoes or the like for the removal of the skins, comprising a support structure, a tank mounted on said structure for holding a liquid for treating the tomatoes, a power driven endless conveyor having a run extending through said tank below the liquid level for advancing tomatoes through the tank while submerged in the treating liquid, a load station for said conveyor, said conveyor having transverse flights provided with upstanding prongs for receiving tomatoes impaled thereon at said load station for passage through the treating liquid in said tank, and a flexible sheet-like strip suspended in said tank above said prongs for holding the impaled tomatoes submerged in said liquid and against displacement from said prongs during their passage through said tank for the duration of the liquid treatment.

2. The apparatus of claim 1 wherein a steam chamber is mounted on said support structure through which chamber said conveyor run extends for further treatment of the tomatoes, said loading station and said steam chamber being disposed adjacent opposite ends of said conveyor, and said tank being disposed intermediate said conveyor ends between said loading station and said steam chamber.

3. The apparatus of claim 2 wherein said steam chamber is spaced from said tank along said conveyor, and said conveyor run is inclined upwardly after leaving said tank to expose the tomatoes thereon to the atmosphere before entering said steam chamber.

References Cited in the file of this patent

UNITED STATES PATENTS

| | | |
|---|---|---|
| 969,238 | Wright | Sept. 6, 1910 |
| 1,071,334 | Pease | Aug. 26, 1913 |
| 1,438,467 | Walden | Dec. 12, 1922 |
| 1,448,532 | Harding | Mar. 13, 1923 |
| 2,556,385 | Allan | June 12, 1951 |
| 2,703,124 | Buck | Mar. 1, 1955 |
| 2,781,070 | Kilburn et al. | Feb. 12, 1957 |